(12) United States Patent
Buck et al.

(10) Patent No.: US 10,427,056 B2
(45) Date of Patent: Oct. 1, 2019

(54) SEATING DEVICE

(71) Applicant: BEC GmbH, Pfullingen (DE)

(72) Inventors: Matthias Buck, Reutlingen (DE);
Martin Gerlich, Stuttgart (DE)

(73) Assignee: BEC GmbH, Pfullingen (DE)

( * ) Notice: Subject to any disclaimer, the term of this patent is extended or adjusted under 35 U.S.C. 154(b) by 96 days.

(21) Appl. No.: 15/795,059

(22) Filed: Oct. 26, 2017

(65) Prior Publication Data

US 2018/0111054 A1    Apr. 26, 2018

(30) Foreign Application Priority Data

Oct. 26, 2016   (DE) .................... 10 2016 012 805

(51) Int. Cl.
| | |
|---|---|
| *A63G 7/00* | (2006.01) |
| *B25J 11/00* | (2006.01) |
| *A63G 27/02* | (2006.01) |
| *A63G 31/04* | (2006.01) |
| *B60R 21/02* | (2006.01) |
| *B60R 21/00* | (2006.01) |

(52) U.S. Cl.
CPC ............... *A63G 7/00* (2013.01); *A63G 27/02* (2013.01); *A63G 31/04* (2013.01); *B25J 11/003* (2013.01); *B60R 21/02* (2013.01); *B60R 2021/0097* (2013.01); *B60R 2021/022* (2013.01)

(58) Field of Classification Search
CPC .......... A63G 7/00; A63G 27/02; A63G 31/04; B25J 11/003

USPC ........ 297/487, 232, 248; 472/125, 119, 130, 472/59, 60; 434/55
See application file for complete search history.

(56) References Cited

U.S. PATENT DOCUMENTS

| | | | | |
|---|---|---|---|---|
| 3,531,153 A | * | 9/1970 | Mohs ....................... | B60N 2/02 296/68.1 |
| 5,529,382 A | * | 6/1996 | Burkat ..................... | A63G 7/00 297/487 |
| 5,558,309 A | * | 9/1996 | Marechal ............ | B64D 11/0693 244/118.5 |
| 5,597,139 A | * | 1/1997 | Beroth ............... | B64D 11/0693 244/118.6 |
| 5,727,845 A | * | 3/1998 | Jackson-Wynch .......................... | B64D 11/0693 244/118.6 |
| 5,769,360 A | * | 6/1998 | Kerbis ................... | B64D 11/06 244/118.6 |
| 6,776,722 B2 | * | 8/2004 | De-Gol .................. | A63G 31/16 434/55 |
| 8,393,680 B2 | * | 3/2013 | Zimmermann .... | B64D 11/0693 297/248 |

(Continued)

*Primary Examiner* — Syed A Islam
(74) *Attorney, Agent, or Firm* — Walter Ottesen, P.A.

(57) ABSTRACT

A seating device for connection to a movement mechanism includes at least one seat and a fastening flange. The fastening flange has at least one flange clamping receptacle, and the seat has at least two seat clamping receptacles for connection to the fastening flange. At least one clamping device is provided, which extends in the direction of a clamping axis. The flange clamping receptacle is arranged in the direction of the clamping axis between two of the at least two seat clamping receptacles. The clamping device passes through the two seat clamping receptacles arranged on either side of the flange clamping receptacle and clamps them together in the direction of the clamping axis.

14 Claims, 11 Drawing Sheets

(56) References Cited

U.S. PATENT DOCUMENTS

| | | | | |
|---|---|---|---|---|
| 8,864,594 B2* | 10/2014 | Hasenzahl | ............... | A63G 1/10 |
| | | | | 434/55 |
| 9,011,259 B2* | 4/2015 | Schmidt | ................. | A63G 31/16 |
| | | | | 434/29 |
| 9,144,745 B2* | 9/2015 | Snyder | ..................... | A63G 7/00 |
| 10,155,171 B2* | 12/2018 | Crawford | ............... | A63G 27/02 |
| 2007/0009861 A1 | 1/2007 | Heinrich | | |
| 2015/0246290 A1 | 9/2015 | De-Gol | | |

* cited by examiner

SEATING DEVICE

CROSS REFERENCE TO RELATED APPLICATION

This application claims priority of German patent application no. 10 2016 012 805.4, filed Oct. 26, 2016, the entire content of which is incorporated herein by reference.

FIELD OF THE INVENTION

The invention relates to a seating device for connection to a movement mechanism.

BACKGROUND OF THE INVENTION

Seating devices which are connected to a movement mechanism are provided for example on rides at amusement parks or at fairs. Usually, seating devices on such movement mechanisms are configured as a welded construction. Therefore, the seating device has a relatively heavy weight, which has to be moved by the movement mechanism. Furthermore, there are high demands placed on the welded connections of such seating devices, so that the manufacture of such seating devices is costly.

SUMMARY OF THE INVENTION

It is an objection of the invention to provide a seating device for connection to a movement mechanism that can be produced in an easy manner and has a low weight.

This object can, for example, be achieved by a seating device for connection to a movement mechanism wherein the seating device includes at least one seat and a fastening flange, wherein the fastening flange has a flange section for connection to the movement mechanism and at least one flange clamping receptacle for connection to the at least one seat, wherein the seating device has at least two seat clamping receptacles, wherein each seat clamping receptacle is secured to a seat, wherein the seating device has at least one clamping device, which extends in the direction of a clamping axis, wherein the flange clamping receptacle is arranged in the direction of the clamping axis between two of the at least two seat clamping receptacles and wherein the clamping device passes through at least the two seat clamping receptacles arranged on both sides of the flange clamping receptacle and through the flange clamping receptacle and clamps together the seat clamping receptacles and the flange clamping receptacle in the direction of the clamping axis.

The seating device according to the invention has a clamping device, which clamps the at least one seat with a fastening flange, instead of the usual welded connections. The fastening flange has a flange section for connection to the movement mechanism. The flange section can be screwed together with the movement mechanism. The fastening flange has at least one flange clamping receptacle, which is clamped between two seat clamping receptacles. Accordingly, the connection between seat and fastening flange is effected by a clamping connection and not a welded connection. The clamping connection is preferably releasable. Such clamping connections can be of simple configuration, and can be simply and safely produced. A defined clamping force can be safely applied in simple manner, for example by a torque wrench. The flange clamping receptacle is preferably held clamped between the seat clamping receptacles.

Advantageously, each seat has at least two seat clamping receptacles. The fastening flange can be arranged in particular between two seat clamping receptacles of a seat or between two seat clamping receptacles of neighboring seats.

The clamping device advantageously passes through at least one seat clamping receptacle of each seat of the seating device and clamps this to the flange clamping receptacle. Thus, with the clamping device, all the seats of the seating device can be clamped with one fastening flange. However, several fastening flanges for a seating device may also be advantageous. A simple configuration results if the clamping device is braced in the direction of the clamping axis against end faces of the outer seat clamping receptacles through which the clamping device passes, and the clamping force is directed across the end faces of these seat clamping receptacles.

A simple configuration results when each seat has a seat shell, which is produced as a single piece with at least one, especially with the at least two seat clamping receptacles. In an especially preferred configuration, the seat shell is a cast component, especially one made of metal. In this way, the seat can be produced with relatively low weight. Because the at least one seat clamping receptacle is already produced as a single piece with the seat, no additional manufacturing step is needed for the connecting of the seat shell to the seat clamping receptacles, such as the making of a welded connection or a screw connection.

Advantageously, the seating device has two clamping devices, whose clamping axes are at a spacing from each other. Thanks to the two clamping devices, the rotary position of the seats about the clamping axes is easily established. Since the entire clamping force does not need to be applied by a single clamping device, the dimensions of each clamping device can be correspondingly smaller, so that a space-saving arrangement is possible. In this way, the movement capabilities of the seating device are less restricted by the clamping devices, so that there is great freedom of movement. In a preferred configuration, the at least two clamping axes run parallel to each other. In a preferred configuration, the fastening flange is also made as a single casting. The fastening flange is advantageously arranged in the middle of the seating device in the direction of the clamping axis.

It may be provided that the seating device includes only one seat. But in an especially preferred configuration, the seating device includes at least two seats. A larger number of seats may also be advantageous, being advantageously arranged in a row along the clamping axis. The seats are preferably oriented so that people sit next to each other on the seats. However, an arrangement of the seats one behind the other may also be advantageous.

The spacing between neighboring seat clamping receptacles of two neighboring seats advantageously corresponds to at least the width of the flange clamping receptacle. Advantageously, the spacing between neighboring seat clamping receptacles of a seat corresponds to at least the width of the flange clamping receptacle. In this way, the fastening flange may be arranged either between two seat clamping receptacles of a seat or between seat clamping receptacles of neighboring seats. In this way, it is possible to arrange the fastening flange in the middle of the seating device in the direction of the clamping axis, regardless of the number of seats.

In order to be able to clamp together all the seats of the seating device with a shortest possible clamping means it is provided that the seating device has two outer seat clamping receptacles and the clamping means passes through all seat clamping receptacles arranged on a clamping axis between the two outer seat clamping receptacles. The clamping means does not pass through the two outer seat clamping receptacles, but only the inner seat clamping receptacles of the outer seats. The terms "outer" and "inner" pertain here to the direction of the clamping axis.

The seating device is advantageously modular in configuration. In an advantageous configuration, all seats of the seating device are identical. In order to provide seating devices with different number of seats, only the corresponding number of seats needs to be connected with a fastening flange by at least one clamping device. In order to bridge the distance between neighboring seat clamping receptacles, advantageously at least one spacing sleeve is provided, which is arranged between two neighboring seat clamping receptacles and bridges the distance between the seat clamping receptacles. The length of the spacing sleeve is advantageously precisely as large as, or only slightly smaller than the distance between neighboring seat clamping receptacles. Advantageously, the clamping force of the clamping device is transmitted by the spacing sleeve between the seat clamping receptacles. In order to simplify the assembly and secure the relative positioning of the seats in simple manner, at least one centering sleeve is provided, through which the clamping means protrudes. The centering sleeve protrudes into at least two neighboring seat clamping receptacles. Inside the flange clamping receptacle there is arranged advantageously an inner sleeve, which protrudes into the two seat clamping receptacles arranged adjacent to the flange clamping receptacle. In this way, the position of the fastening flange relative to the at least one seat is established until the clamping means is mounted and the at least one clamping device is fixed in place. The clamping means is advantageously arranged with a radial spacing from the inner sleeve and the centering sleeve.

Preferably, the at least one seat clamping receptacle is arranged in the rear and bottom region of the at least one seat. The seat advantageously has a sitting surface and a backrest, which are joined together in a connection region. The connection region is in particular the region in which the sitting surface, oriented approximately horizontally in the upright sitting position, is connected to the upward extending backrest in the upright sitting position. The at least one seat clamping receptacle is advantageously arranged on the side of the seat facing away from a person sitting on the seat, that is, behind the backrest and/or underneath the sitting surface, as seen by the person. The at least one seat clamping receptacle has a spacing from the connection region of less than 20 cm, especially less than 10 cm. In a preferred configuration, the at least one seat clamping receptacle is arranged directly at the connection region.

A simple configuration results when the clamping device is a tubular clamping sleeve, having a lock nut screwed onto its end segment and applying the clamping force of the clamping device. The lock nut is advantageously braced against the end faces of the first and last seat clamping receptacle through which the clamping device passes. The at least one seat clamping receptacle and the at least one flange clamping receptacle are advantageously configured as sleeves.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
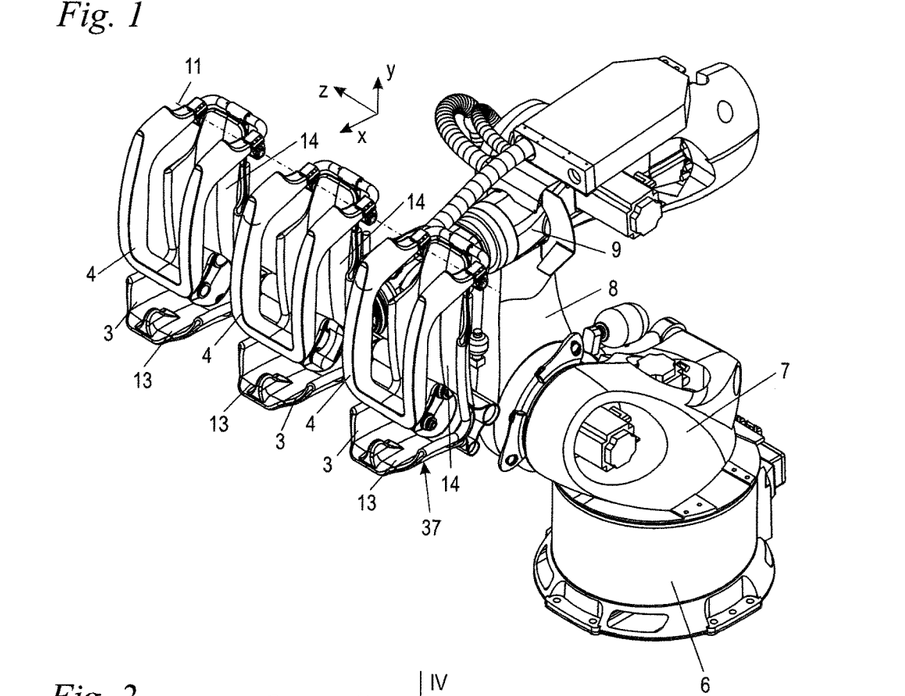
FIG. 1 is a perspective representation of a first seating device on a movement mechanism.

FIG. 1 shows in perspective representation a seating device 1 which is held on a movement mechanism 2. The movement mechanism 2 advantageously forms with the seating device 1 a ride, such as for an amusement park or a fair. In the sample embodiment, the seating device 1 has three seats 3. Cushions or the like (not shown) may be arranged on the seats 3. The seats 3 each have a sitting surface 13 and a backrest 14. At the top end of the backrest 14 of each seat 3 a safety bar 4 is secured and able to swivel about a pivot axis 11, with which a person is held on the seat 3 during the ride. To activate the safety bar 4, there is provided an activating mechanism 5, visible in FIG. 2, which can be formed by a pneumatic cylinder, for example.

Figure 2:
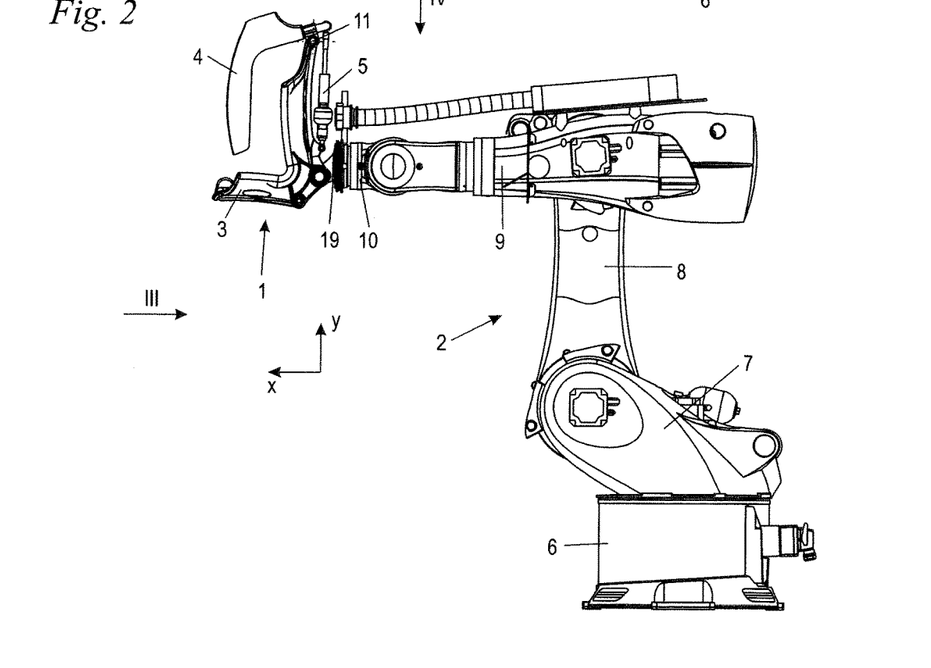
FIG. 2 is the movement mechanism with the seating device of FIG. 1, in side view.

In the sample embodiment, the movement mechanism 2 is configured as a robot arm, namely a six-axis robot. As shown by FIGS. 1 and 2, the movement mechanism 2 has a stand 6, on which a carousel 7 is mounted and able to rotate about a first axis of rotational movement, oriented vertically in the sample embodiment. A rocker 8 is mounted pivotably on the carousel 7. An arm 9 is mounted pivotably on the rocker 8. A hand segment 10 is arranged on the arm 9, enabling rotation about three axes of rotational movement. A fastening flange 19 of the seating device 1 is secured to the hand segment 10, as shown in FIG. 2. A Cartesian coordinate system is drawn in FIGS. 1 and 2, whose y axis runs vertically and whose x axis and z axis run horizontally. In the orientation of the seating device 1 shown in FIGS. 1 and 2, the seats 3 lie horizontally next to each other in the z direction. The backrest 14 is oriented roughly in the y direction and z direction, and the sitting surface 13 extends approximately in the z direction and x direction. A person arranged on a seat 3, when looking forward, sees in the x direction.

Figure 3:
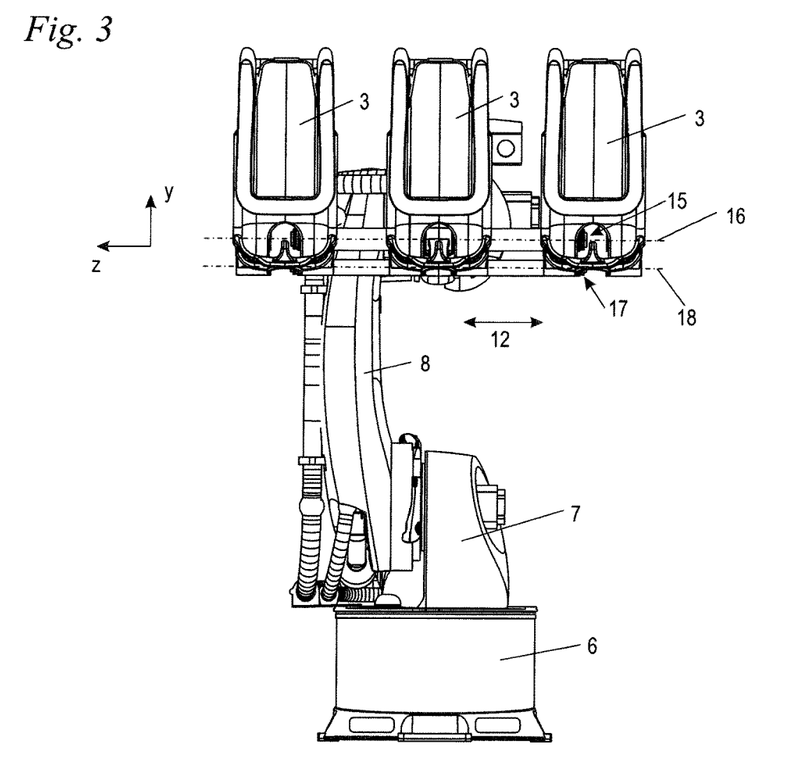
FIG. 3 is a side view in the direction of arrow III in FIG. 2.
Figure 4:
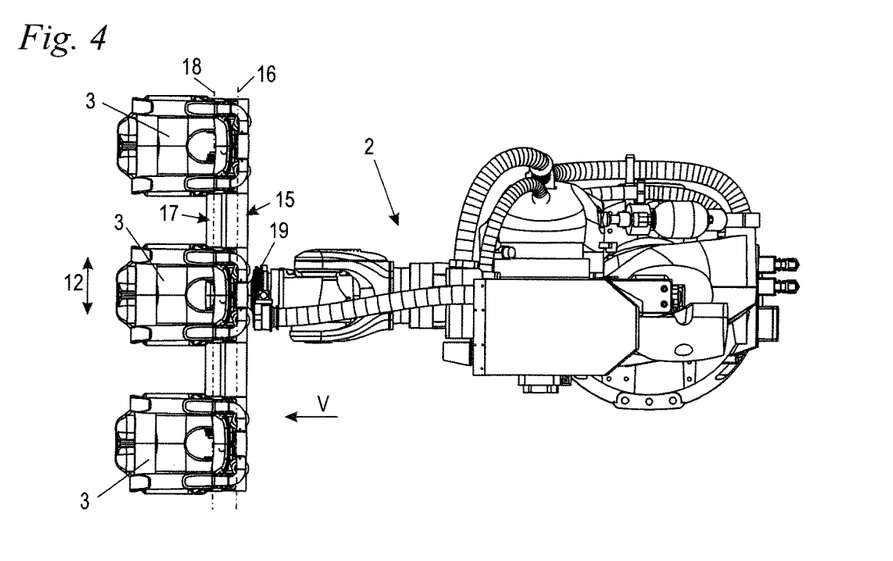
FIG. 4 is a top view in the direction of arrow IV in FIG. 2.

As shown by FIGS. 3 and 4, the seats 3 are arranged alongside each other in the transverse direction 12. The transverse direction 12 is the sideways direction of a person sitting on a seat 3. In the position of the seating device 1 shown in FIGS. 1 to 4, the transverse direction 12 is oriented in the z direction. The three seats 3 are connected to each other and to the fastening flange 19 by a first clamping device 15 and a second clamping device 17. The clamping device 15 has a clamping axis 16, and the clamping device 17 has a clamping axis 18. The clamping axes 16 and 18 are arranged parallel to each other in the sample embodiment. The clamping axis 16 and the clamping axis 18 run in the transverse direction 12 of the seats 3.

The movement mechanism 2 can only lift and move a limited weight. In order to be able to configure the seating device 1 with low weight, the seats 3 are not connected by welded connections to the movement mechanism 2, but instead by the clamping devices 15 and 17, which enable a low weight.

Figure 5:
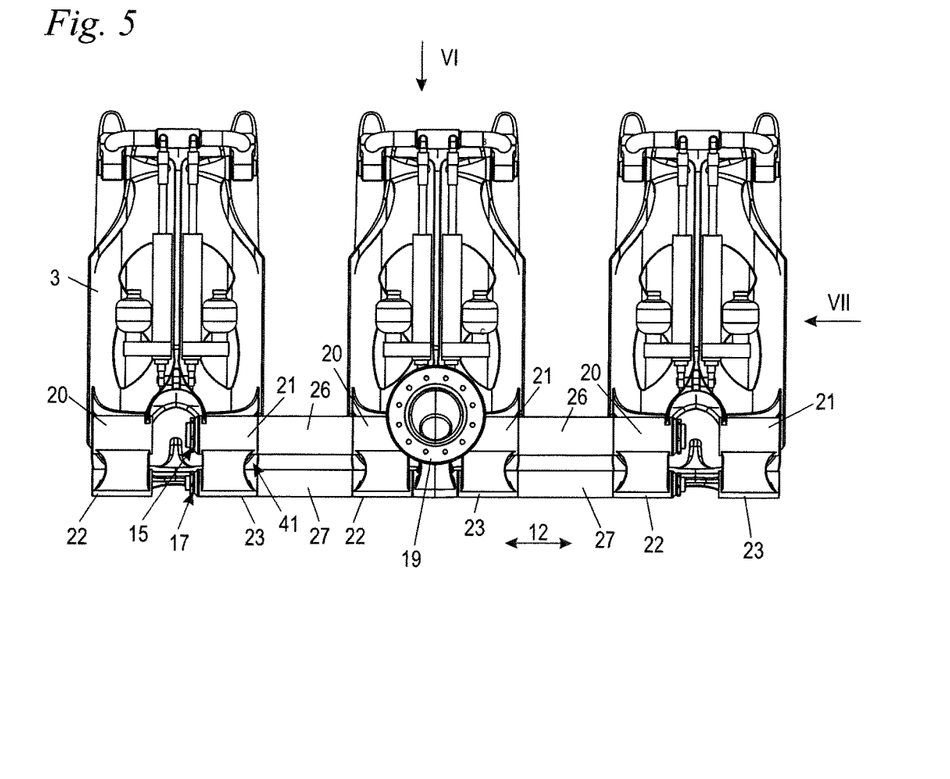
FIG. 5 is a side view in the direction of arrow V in FIG. 4.

As FIG. 5 shows, each seat 3 has seat clamping receptacles 20, 21, 22 and 23, by which seats 3 are connected to the fastening flange 19. Each seat has a left seat clamping receptacle 20 and a right seat clamping receptacle 21. The terms "left", "right", "front", "rear", "top" and "bottom" pertain to a person seated on the seat 3. The seat 3 furthermore has a left seat clamping receptacle 22 and a right seat clamping receptacle 23, which are arranged in front of and beneath the seat clamping receptacles 20 and 21 and have a somewhat smaller diameter in the sample embodiment. The seat clamping receptacles 20 and 21 are clamped together by the clamping device 15 and the seat clamping receptacles 22 and 23 by the clamping device 17. The left seat clamping receptacle 20 of the left seat 3 and the right seat clamping receptacle 21 of the right seat 3 are not clamped by the clamping device 15. Accordingly, the left seat clamping receptacle 22 of the left seat 3 and the right seat clamping receptacle 23 of the right seat 3 are not clamped by the clamping device 17. The clamping device 15 protrudes through spacing sleeves 26, which are arranged between seat clamping receptacles 21 and 20 of adjacent seats 3. The clamping device 17 protrudes through spacing sleeves 27, which are arranged between seat clamping receptacles 22 and 23 of adjacent seats 3.

Figure 6:
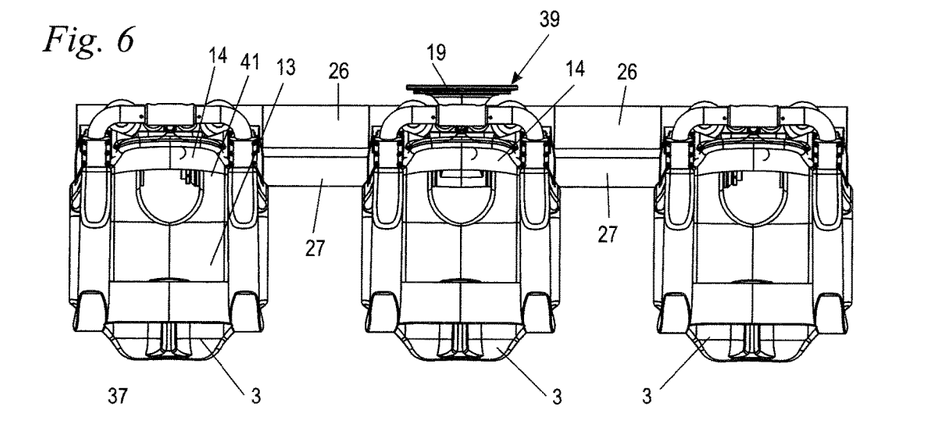
FIG. 6 is a side view in the direction of arrow VI in FIG. 5.

As shown by FIGS. 5 and 6, the backrest 14 and the sitting surface 13 are joined together in a connection region 41. The seat clamping receptacles 20, 21, 22 and 23 are arranged directly at the connection region 41. The spacing of the seat clamping receptacles 20 to 23 from the connection region 41 is advantageously less than 20 cm, especially less than 10 cm. The fastening flange 19 protrudes between the left seat clamping receptacles 20 and 22 and the right seat clamping receptacles 21 and 23 of the middle seat 3. As shown by FIG. 6, the fastening flange 19 has a flange section 39 which serves for connecting to the movement mechanism 2 (FIGS. 1 to 4). The flange section 39 is configured as a circular ring, which extends roughly parallel to the backrest 14 of the middle seat 3 behind the backrest 14. In the sample embodiment, the flange section 39 is arranged behind the backrest 14 and above the sitting surface 13 in relation to a person sitting upright on the seat 3.

Figure 7:
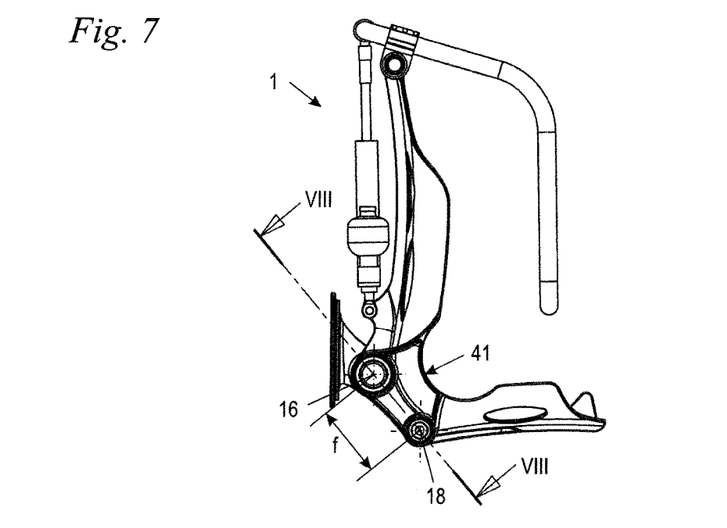
FIG. 7 is a side view in the direction of arrow VII in FIG. 5.

As shown by FIG. 7, the clamping axes 16 and 18 have a spacing f between each other. Thanks to the spacing f, the clamping devices 15 and 17 determine the rotary position of the seating device 1 about the clamping axes 16 and 18.

Figure 8:
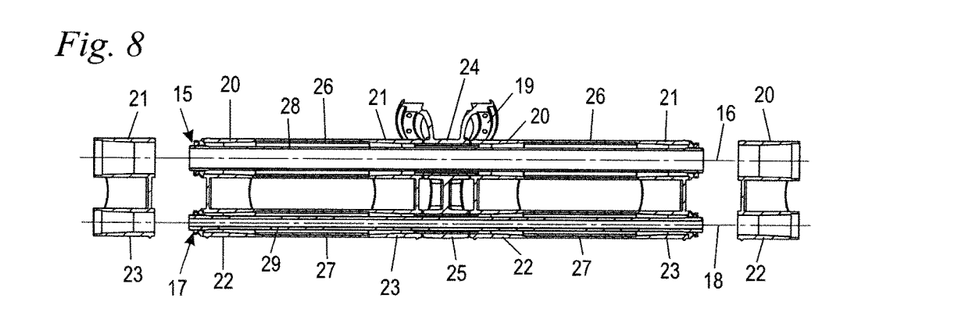
FIG. 8 is a cross section along line VIII-VIII of FIG. 7.

On account of the layout of the cross section in FIG. 8, the right seat 3 is shown at left and the left seat 3 at right. As FIG. 8 shows, the first clamping device 15 has a first clamping sleeve 28, which protrudes through the right seat clamping receptacle 21 of the left seat 3, a spacing sleeve 26, the left seat clamping sleeve 20 of the middle seat 3, a flange clamping receptacle 24 of the fastening flange 19, the right seat clamping receptacle 21 of the middle seat 3, another spacing sleeve 26, and the left seat clamping receptacle 20 of the right seat 3. The seat clamping receptacles 21 and 20 of the outer seats 3 are not penetrated by the clamping sleeve 28. The clamping sleeve 28 braces together the seat clamping receptacles 20, 21, the spacing sleeves 26 and the flange clamping receptacle 24 in the direction of the clamping axis 16 and thereby secures them in relation to each other. Correspondingly, the second clamping device 17 has a second clamping sleeve 29, which protrudes through the right seat clamping receptacle 23 of the left seat 3, a spacing sleeve 27, the left seat clamping receptacle 22 of the middle seat 3, a flange clamping receptacle 25 of the fastening flange 19, the right seat clamping receptacle 23 of the middle seat 3, another spacing sleeve 27, and the left seat clamping receptacle 22 of the right seat 3. The left seat clamping receptacle 22 of the left seat 3 and the right seat clamping receptacle 23 of the left seat 3 are not penetrated by the clamping sleeve 29. The seat clamping receptacles 20, 21 and the flange clamping receptacle 24 have approximately the same outer diameter and the same inner diameter. Accordingly, the clamping receptacles 22 and 23 as well as the flange clamping receptacle 25 have approximately the same inner diameter and outer diameter.

Figure 9:
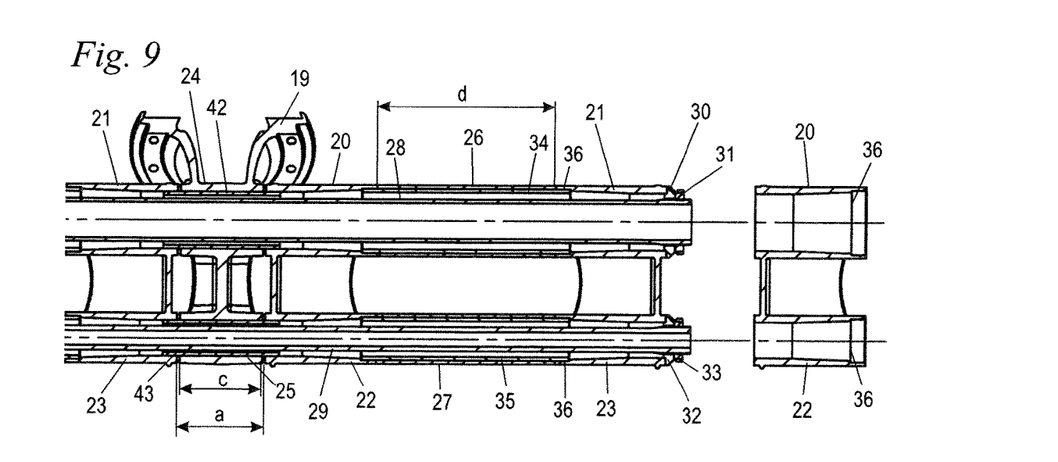
FIG. 9 is a partly enlarged representation of the cross section of FIG. 8.

As shown by FIG. 9, the spacing sleeves 26 and 27 have a length which corresponds to the spacing d between adjacent seat clamping receptacles 20, 21 or 22, 23 of adjacent seats 3. The seat clamping receptacles 20, 21, 22 and 23 each have a shoulder 36 at their outwardly pointing sides in regard to the respective seat 3 at which the inner diameter of the seat clamping receptacles 20, 21, 22 and 23 increases. A centering sleeve 34, 35 protrudes into the shoulders 36 of the seat clamping receptacles 20, 21, 22 and 23 of adjacent seats 3. The centering sleeves 34 are arranged inside the spacing sleeves 26 and the centering sleeves 35 inside the spacing sleeves 27. The centering sleeves 34, 35 may also be produced as a single piece with the respective spacing sleeves 26, 27. In this way, a centering of adjacent seats with respect to each other is achieved prior to the securing of the clamping devices 15 and 17.

As FIG. 9 also shows, the seat clamping receptacles 20 and 21 of a seat as well as the seat clamping receptacles 22 and 23 of a seat 3 have a spacing a from each other which is only slightly larger than the width c of the flange clamping receptacles 24 and 25. In the sample embodiment, the spacings a and the widths c of the two clamping devices 15 and 17 are the same size. However, different spacings and lengths of the two clamping devices 15 and 17 can also be provided, as long as these are coordinated with each other within a clamping device 15, 17. As FIG. 9 also shows, an inner sleeve 42 protrudes through the flange clamping receptacle 24, which protrudes into the adjacent seat clamping receptacles 20 and 21. An inner sleeve 43 protrudes through the flange clamping receptacle 25, which protrudes into the seat clamping receptacles 22 and 23. In this way, the fastening flange 19 is predetermined in its position even prior to the securing of the clamping devices 15 and 17 and centered about the clamping axes 16 and 18.

As FIG. 9 also shows, the clamping device 15 has a lock nut 30, which is screwed onto one end of the clamping sleeve 28. The clamping sleeve 28 has an outer thread for this, on which the inner thread of the lock nut 30 is screwed. A retaining nut 31 serves as security. In corresponding manner, a lock nut 32 is screwed onto the clamping sleeve 29 and secured by a retaining nut 33. The clamping sleeves 28 and 29 are preferably formed as deep drawn tubes, at whose ends outer threads are produced, into which the lock nuts 30, 32 and retaining nuts 31 and 33 are screwed.

Figure 10:
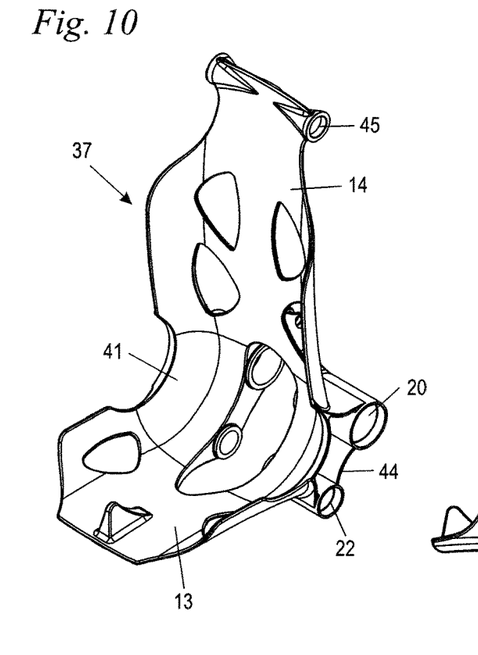
FIG. 10 is a perspective representation of a seat shell of the seating device.
Figure 11:
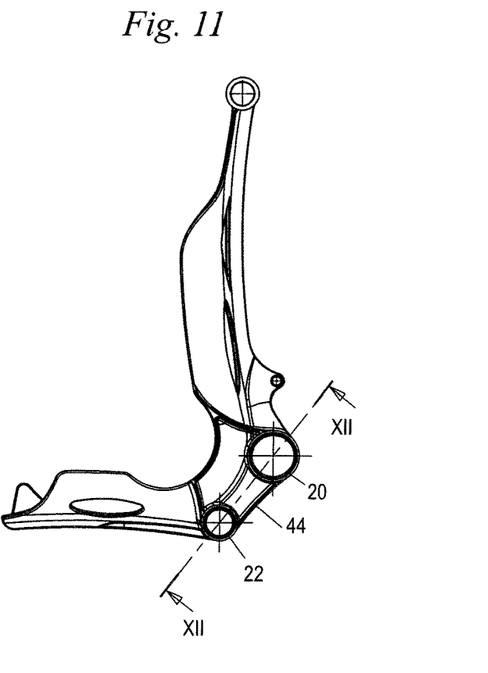
FIG. 11 is a side view of the seat shell of FIG. 10.
Figure 12:
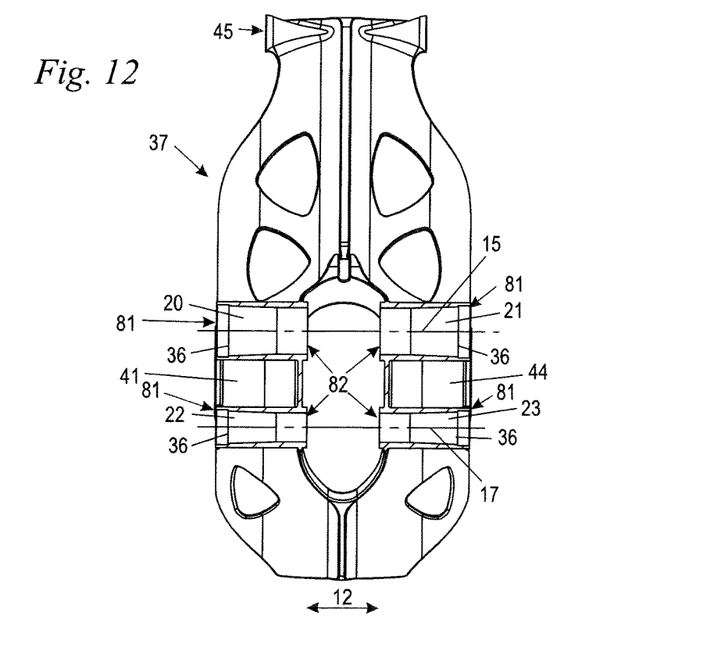
FIG. 12 is a cross section along line XII-XII of FIG. 11.
Figure 13:
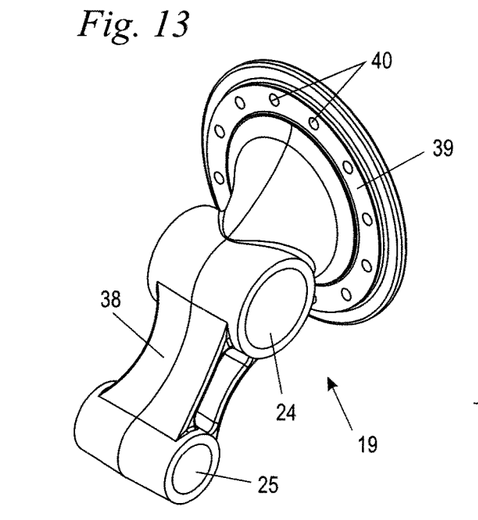
FIG. 13 is a perspective representation of the fastening flange of the seating device.
Figure 14:
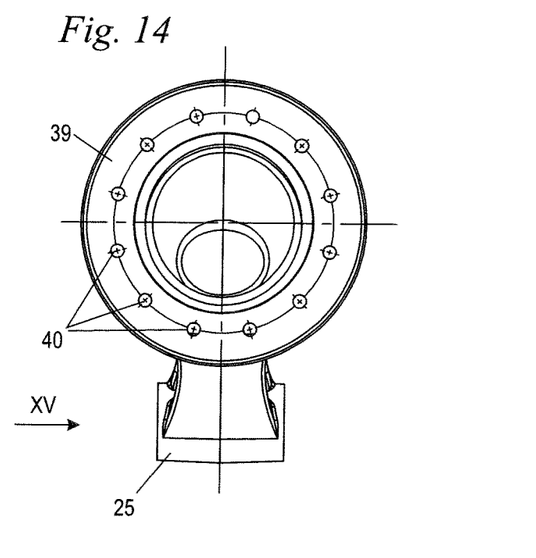
FIG. 14 is a side view of the fastening flange.
Figure 15:
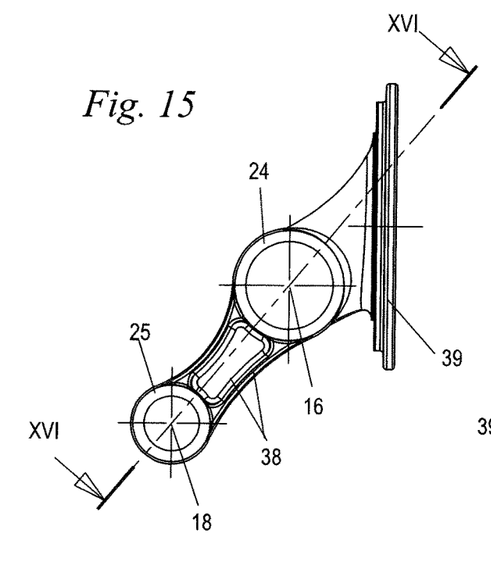
FIG. 15 is a side view in the direction of arrow XV in FIG. 14.

In order to accomplish a simple construction and low weight of the seats 3, the seats 3 are made each time of a seat shell 37, as shown in FIG. 1. A seat shell 37 is shown in detail in FIGS. 10 to 12. The seat shell 37 is fashioned as a single casting, preferably made of metal. The seat clamping receptacles 20, 21, 22, and 23 are molded as a single piece on the seat shell 37, as shown in particular by FIG. 12. In the sample embodiment, bearing seats 45 for the mounting of the safety bar 4 are provided on each seat shell 37 at the upper end of the backrest 14 on either side. The seat clamping receptacles 20, 21, 22, and 23 are also molded on the seat shell 37. The seat clamping receptacles 20 and 22, as well as the seat clamping receptacles 21 and 23, are each joined to each other by a stiffening web 44, as shown in FIGS. 10 to 12. As FIGS. 10 to 12 also show, the seat clamping receptacles 20 to 23 are fashioned as cylindrical sleeves, each of which has the shoulder 36 on its outer side. The shoulder 36 is also advantageously already made in the casting process. The seat clamping receptacles 20 to 23 possess outer end faces 81 and inner end faces 82. The lock nut 30 or 32 of a clamping device 15 or 17 lies against one end face 81 or 82. The end faces 81 and 82 are therefore preferably machine-finished, so that the end faces 81 and 82 form a flat abutment for the lock nuts 30 and 32 and are oriented perpendicular to the clamping axes 16 and 18. As FIG. 12 also shows, the clamping axes 16 and 18 are oriented parallel to the transverse direction 12.

Figure 16:
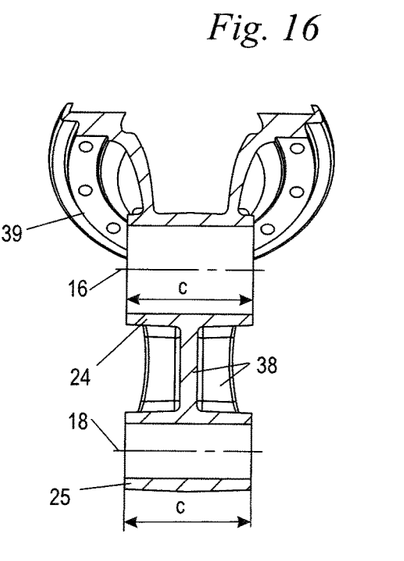
FIG. 16 is a cross section along line XVI-XVI of FIG. 15.
Figure 17:
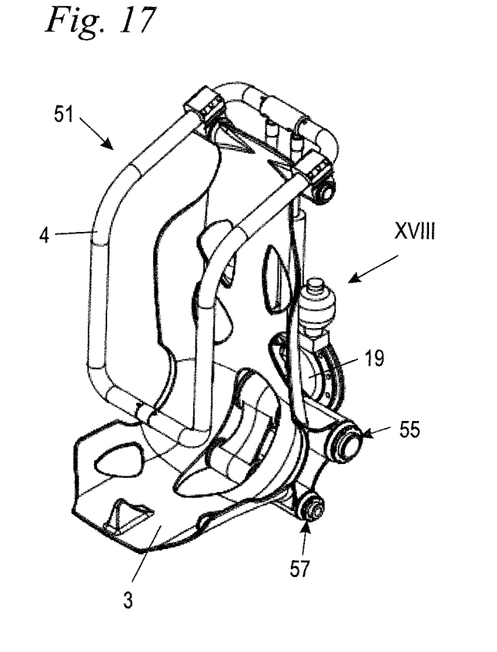
FIG. 17 is a perspective representation of another sample embodiment of a seating device.
Figure 18:
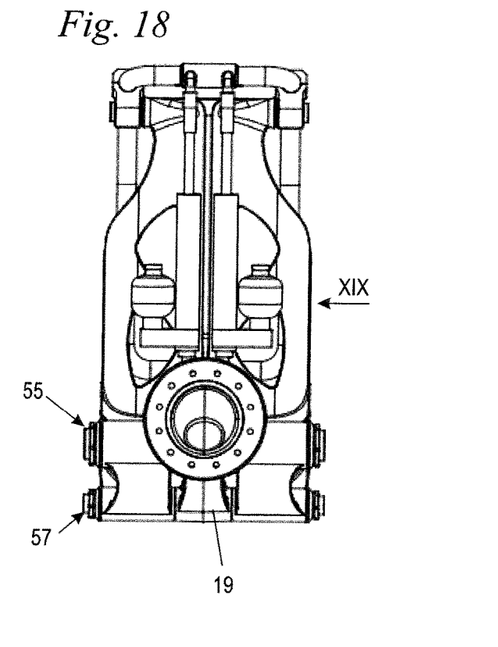
FIG. 18 is a side view of the seating device in the direction of arrow XVIII in FIG. 17.
Figure 19:
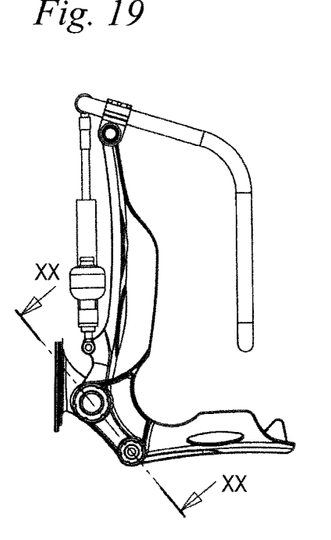
FIG. 19 is a side view in the direction of arrow XIX in FIG. 18.

FIGS. 13 to 16 show the fastening flange 19 in detail. The fastening flange 19 has the flange section 39, which possesses a number of uniformly distributed fastening openings 40 for screwing together with the hand segment 10 (FIG. 2) of the movement mechanism 2. The fastening flange 19 furthermore has the two flange clamping receptacles 24 and 25, which are joined together by connection webs 38. As is shown in particular by FIG. 15, the flange clamping receptacles 24 and 25 extend cylindrically about the clamping axes 16 and 18 and are configured as sleeves. The two flange clamping receptacles 24 and 25 have the same width c, as shown in FIG. 16. The width c is measured parallel to the clamping axes 16 and 18. The fastening flange 19 is made as a single cast piece, especially of metal.

Figure 20:
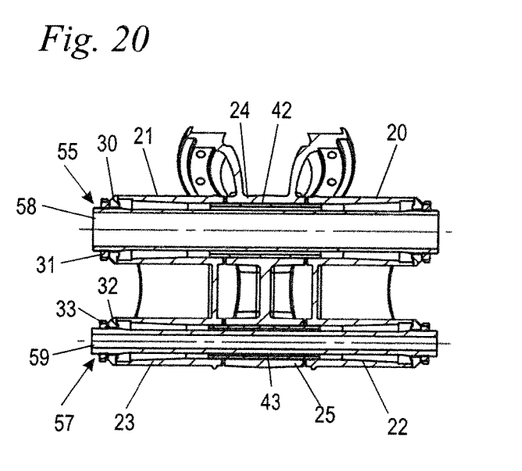
FIG. 20 is a cross section along line XX-XX of FIG. 19.

FIGS. 17 to 20 show a sample embodiment of a seating device 51, having only a single seat 3. The seat 3 is connected by clamping devices 55 and 57 to the fastening flange 19. The configuration of the clamping devices 55 and 57 corresponds basically to the configuration of the clamping devices 15 and 17. The same reference numbers in all figures denote corresponding elements. As FIG. 20 shows, the clamping devices 55 and 57 each have a clamping sleeve 58 or 59, which is tubular in shape and protrudes through the seat clamping receptacles 20, 21 or 22, 23 as well as the flange clamping receptacles 24 or 25. The clamping sleeves 58 and 59 have the same length in the sample embodiment. The clamping sleeves 58 and 59 are shorter than the clamping sleeves 28 and 29 of the seating device 1 with three seats 3. The flange clamping receptacles 24 and 25 are each arranged between a left seat clamping receptacle 20, 22 and a right seat clamping receptacle 21, 23 of the seat 3. The clamping is done, as in the previous sample embodiment, by lock nuts 30, 32 and retaining nuts 31, 33. As shown by FIG. 20, the inner diameter of the seat clamping receptacles 20 to 23 increases toward the outside, so that the inner sleeves 42 and 43 can be easily shoved in from the outside.

Figure 21:
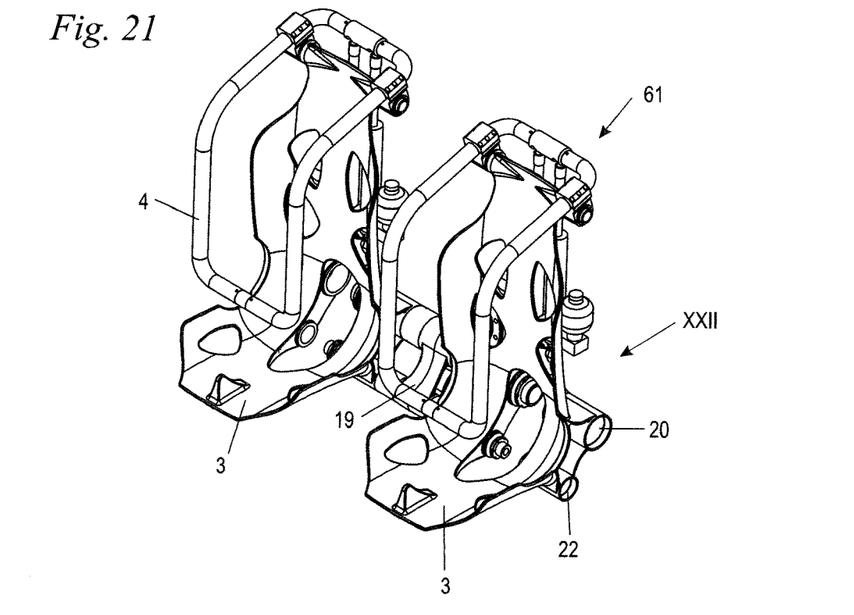
FIG. 21 is a perspective representation of another sample embodiment of a seating device.

FIG. 21 shows a sample embodiment of a seating device 61 including two seats 3. The fastening flange 19 is arranged between the two seats 3.

Figure 22:
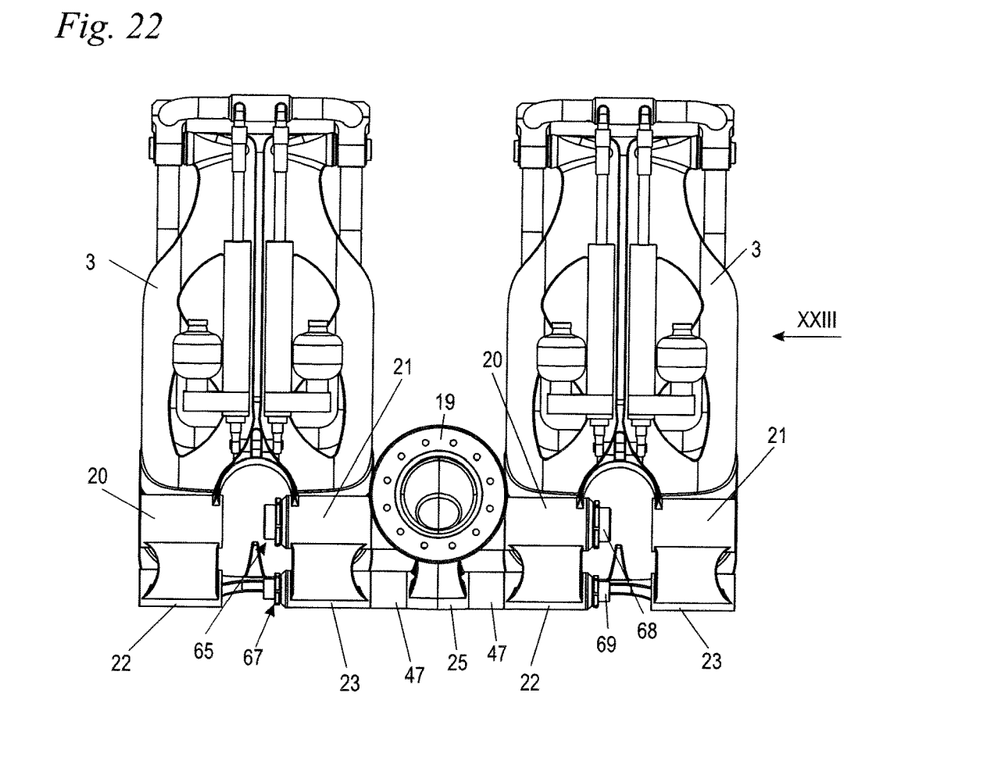
FIG. 22 is a side view of the seating device in the direction of arrow XXII in FIG. 21.
Figure 23:
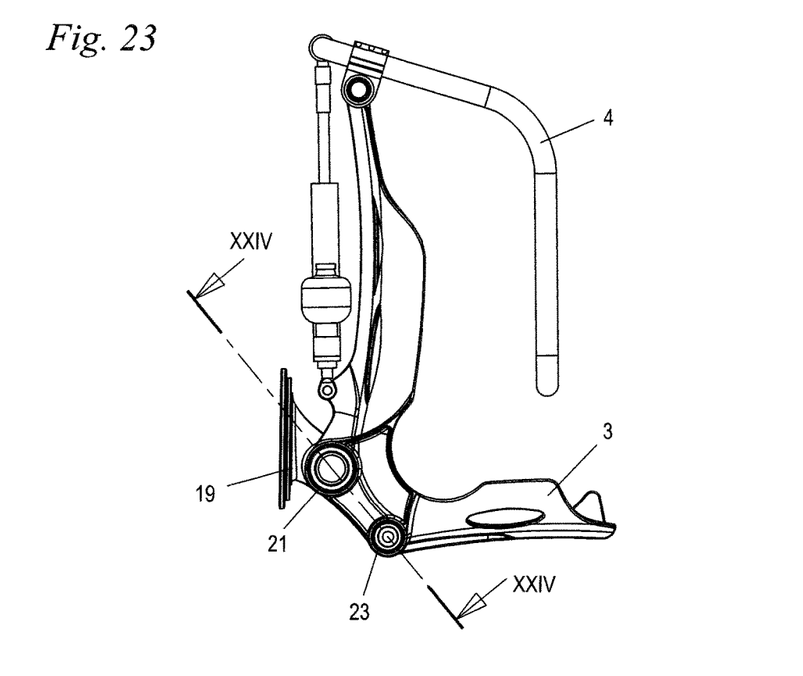
FIG. 23 is a side view in the direction of arrow XXIII in FIG. 22.

As FIG. 22 shows, clamping devices 65 and 67 are provided, which secure the two seats 3 to the fastening flange 19. The clamping device 65 has a clamping sleeve 68, which protrudes through a right clamping receptacle 21 of the left seat 3 and a left seat clamping receptacle 20 of the right seat 3. The outer seat clamping receptacles 20 and 21 of the two seats 3 are not penetrated by the clamping sleeve 68. The second clamping device 67 has a clamping sleeve 69, which protrudes through the right lower clamping receptacle 23 of the left seat, the flange clamping receptacle 25, and the left lower seat clamping receptacle 22 of the right seat. On either side of the flange clamping receptacle 25 is arranged a respective spacing sleeve 47 between the flange clamping receptacle 25 and a clamping receptacle 22 or 23.

Figure 24:
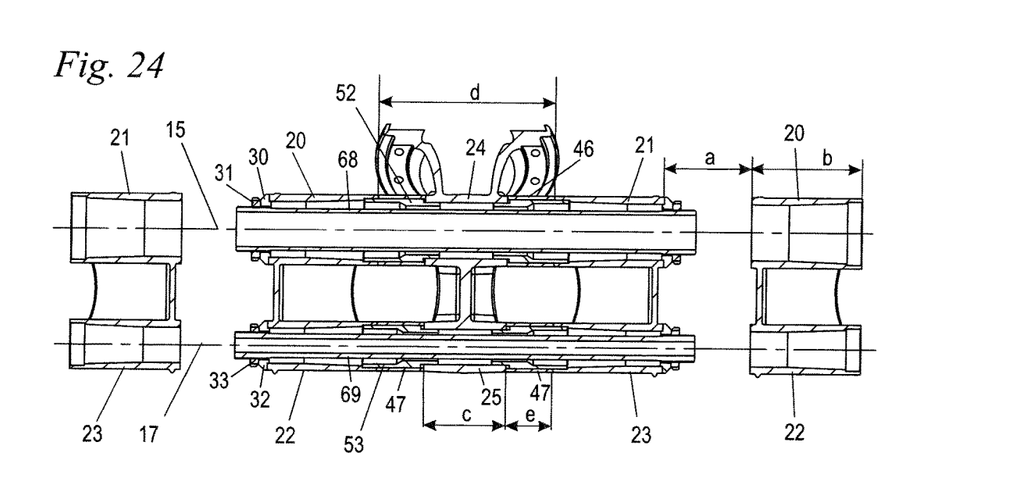
FIG. 24 is a cross section along line XXIV-XXIV of FIG. 23.
Figure 25:
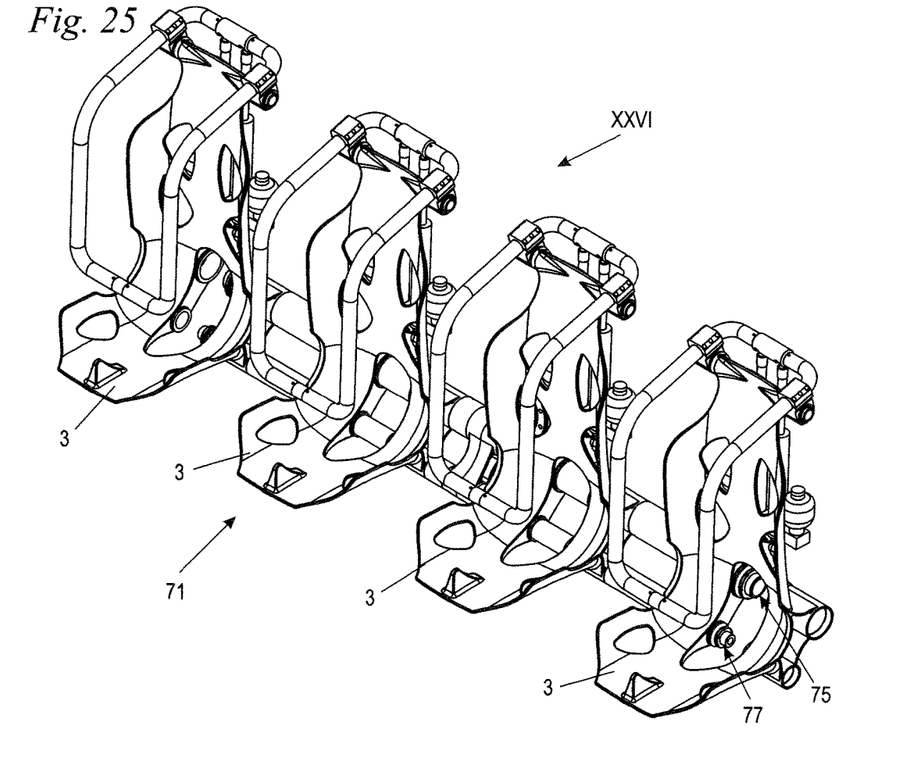
FIG. 25 is a perspective representation of another seating device.

As FIG. 24 shows, the spacing sleeves 47 bridge the distance between the flange clamping receptacle 25 and the adjacent seat clamping receptacles 22 and 23. The seat clamping receptacles 20, 21 and the seat clamping receptacles 22 and 23 of the adjacent seats 3 have the spacing d from each other. The spacing d is distinctly larger than the width c of the flange clamping receptacles 24 and 25. The spacing sleeves 47 have a length e which corresponds to half the difference of the spacing d and the width c. In this way, the clamping force of the clamping sleeve 69 can be transmitted via the seat clamping receptacles 22 and 23 and the spacing sleeves 47 as well as the flange clamping receptacle 25.

As FIG. 24 also shows, corresponding spacing sleeves 46 are arranged between the flange clamping receptacle 24 and the seat clamping receptacles 20 and 21. Inner sleeves 52 are arranged in the spacing sleeves 46, which protrude into the flange clamping receptacle 24 and the associated seat clamping receptacle 20 or 21. Inner sleeves 53 are provided in the spacing sleeves 47, which protrude accordingly into the flange clamping receptacle 25 and the seat clamping receptacle 22 or 23. FIG. 24 also shows the spacing a between two clamping receptacles 20, 21 or 22, 23 of a seat 3. The spacing a in the sample embodiment is distinctly smaller than the spacing d between the seat clamping receptacles 20, 21 or 22, 23 of adjacent seats. The spacings a, d between the seat clamping receptacles 20, 21, 22, 23 of a seat 3 or adjacent seats 3 can be suitably adapted. FIG. 24 also shows the width b of the seat clamping receptacles 20 to 23. In the sample embodiment, the width b of a seat clamping receptacle 20 is indicated as an example. All seat clamping receptacles 20 to 23 in the sample embodiment have the same width b, measured parallel to the clamping axes 16 and 18. The width b in the sample embodiment is smaller than the width c of the flange clamping receptacles 24 and 25. The width b is advantageously 0.5 to 2 times the width c. The width b is advantageously 0.5 to 2 times the spacing a.

Figure 26:
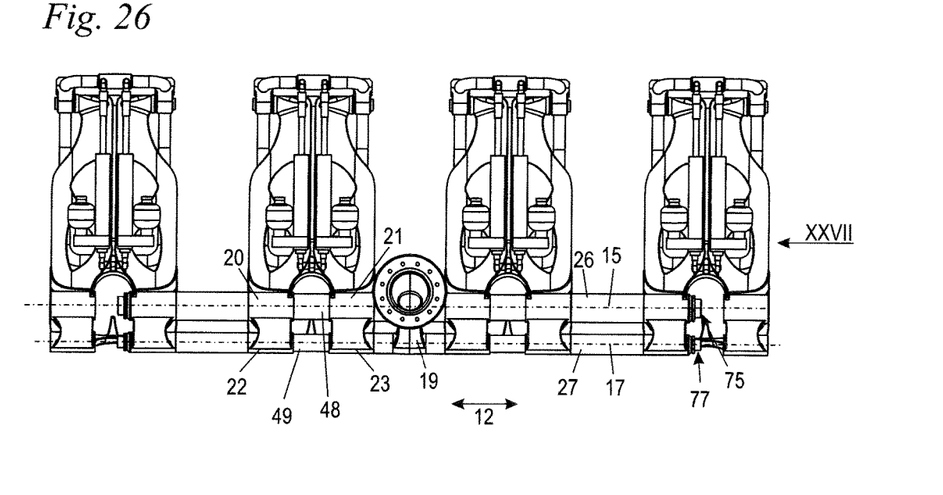
FIG. 26 is a side view of the seating device in the direction of arrow XXVI in FIG. 25.
Figure 27:
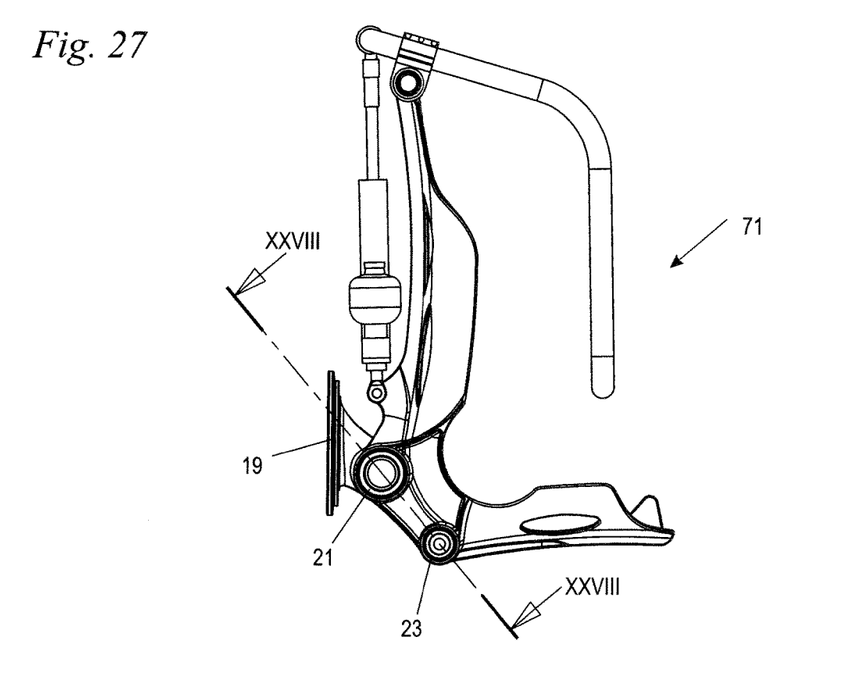
FIG. 27 is a side view in the direction of arrow XXVII in FIG. 26.

FIGS. 25 to 28 show a sample embodiment of a seating device 71 having four seats 3. The seats 3 are joined together by clamping devices 75 and 77. As FIG. 26 shows, the fastening flange 19 is arranged in the middle, so that on either side of the fastening flange 19 there are arranged two seats 3. Spacing sleeves 26 and 27 are arranged in each case between the two outer seats 3. Spacing sleeves 48 are arranged between the seat clamping devices 21 and 20 of the middle two seats 3, which span the distance between the seat clamping receptacles 20 and 21 of a seat 3. Correspondingly, spacing sleeves 49 are arranged between the lower seat clamping receptacles 22 and 23 of a seat 3. The length of the spacing sleeves 48 and 49 corresponds to the spacing a (FIG. 24) between the seat clamping receptacles 20, 21, 22, 23 of a seat 3.

Figure 28:
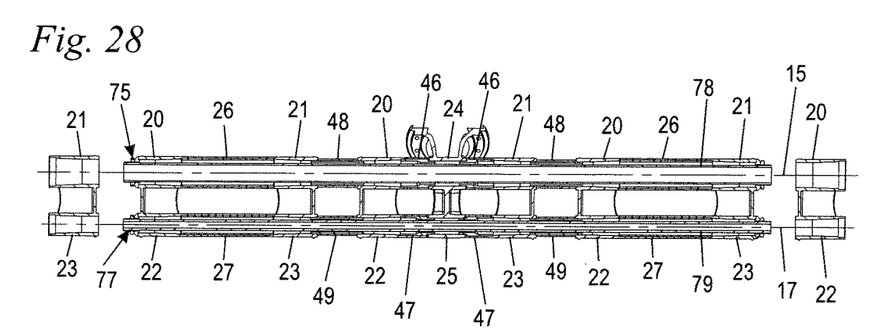
FIG. 28 is a cross section along line XXVIII-XXVIII of FIG. 27.

As FIG. 28 shows, the clamping device 75 has a clamping sleeve 78, which passes through the right seat clamping receptacle 21 of the left seat 3, the seat clamping receptacles 20 and 21 of the two middle seats 3, and the left seat clamping receptacle 20 of the right seat. The clamping device 77 has a clamping sleeve 79, which protrudes in corresponding manner through the right seat clamping receptacle 23 of the left seat, the seat clamping receptacles 22 and 23 of the two middle seats, and the left seat clamping receptacle 22 of the right seat 3. In FIG. 28, the right seat 3 is arranged on the left side and the left seat 3 on the right side of the representation. The outer seat clamping receptacles 20 to 23 of the outer seats 3 are not penetrated by the clamping sleeves 78 and 79.

In all sample embodiments, the clamping devices 15, 17, 55, 57, 65, 67, 75, 77 brace the seat clamping receptacles 20, 21, 22, 23 together with the flange clamping receptacles 24, 25 and thereby secure the seats 3 by force locking to the fastening flange 19. The clamping devices 15, 17, 55, 57, 65, 67, 75, 77 are braced each time by the end faces 81 and 82 of the outer seat clamping receptacles 20, 21, 22, 23, through which the clamping device protrudes. The seat clamping receptacles 20, 21 and the flange clamping receptacle 24 have approximately the same outer diameter and the same inner diameter. Accordingly, the clamping receptacles 22 and 23 as well as the flange clamping receptacle 25 have approximately the same inner diameter and outer diameter. The fastening flange 19 is arranged each time in the middle of the layout. For an even number of seats 3, the fastening flange 19 is thereby arranged between two seats 3 and for an odd number of seats 3 it is arranged between the seat clamping receptacles 20, 21, 22, 23 of the middle seat 3. Distances between adjacent seat clamping receptacles 20, 21, 22, 23 or between seat clamping receptacles 20 to 23 and flange clamping receptacles 24 and 25 are spanned by spacing sleeves 26, 27, 46, 47, 48, 49. This enables a modular configuration, allowing the construction of seating devices with different number of seats with a small number of different modules. Only the length of the clamping sleeves needs to be adapted to the number of seats 3.

It is understood that the foregoing description is that of the preferred embodiments of the invention and that various changes and modifications may be made thereto without departing from the spirit and scope of the invention as defined in the appended claims.

What is claimed is:

1. A seating device configured to be connected to a movement mechanism, the seating device comprising:
   at least one seat;
   a fastening flange having a flange section configured to connect to the movement mechanism and at least one flange clamping receptacle configured to connect to said at least one seat;
   at least two seat clamping receptacles each connected to one of said at least one seat;
   at least one clamping device extending in the direction of a clamping axis;
   said flange clamping receptacle being arranged between two of said at least two seat clamping receptacles;
   said clamping device being configured to project through said two of said at least two seat clamping receptacles arranged on either side of said flange clamping receptacle; and,
   said clamping device being further configured to clamp together said seat clamping receptacles and said flange clamping receptacles in the direction of said clamping axis.

2. The seating device of claim 1, wherein said clamping device is configured to project through at least one seat clamping receptacle of each seat of the seating device and to clamp the seat clamping receptacle together with the flange clamping receptacle.

3. The seating device of claim 1, wherein:
   said at least two seat clamping receptacles each have a respective end face; and,
   said clamping device being configured to, in the direction of the clamping axis, brace against outer ones of said seat clamping receptacles which are projected through by said clamping device and introduce a clamping force via said end faces.

4. The seating device of claim 1, wherein each of said at least one seat has a seat shell formed as a single component with said at least two seat clamping receptacles.

5. The seating device of claim 1, wherein the seating device comprises a first clamping device and a second clamping device each defining a respective clamping axis; and, said clamping axes define a mutual distance (f) to each other.

6. The seating device of claim 1, wherein the seating device comprises at least two seats.

7. The seating device of claim 1, wherein:
   the seating device comprises a first seat and a second seat disposed adjacent to said first seat;
   said at least two seat clamping receptacles include a first seat clamping receptacle associated with said first seat and a second seat clamping receptacle associated with said second seat;
   said first seat clamping receptacle and said second seat clamping receptacle define a mutual distance (d);
   said flange clamping receptacle has a width (c); and,
   said mutual distance (d) is at least as large as said width (c).

8. The seating device of claim 6, wherein:
   the seating device includes two outer seat clamping receptacles; and,
   said clamping device projects through all of said seat clamping receptacles arranged between said two outer seat clamping receptacles.

9. The seating device of claim 6, wherein all of said at least two seats are configured identically.

10. The seating device of claim 1 further comprising:
at least one spacing sleeve arranged between two adjacent ones of said seat clamping receptacles;
said adjacent ones of said seat clamping receptacles defining a mutual distance; and,
said at least one spacing sleeve being configured to bridge said mutual distance.

11. The seating device of claim 1 further comprising:
a centering sleeve;
said clamping device being configured to project through said centering sleeve; and,
said centering sleeve being configured to project into at least two adjacent seat clamping receptacles.

12. The seating device of claim 1 further comprising:
an inner sleeve configured to project into said two of said at least two seat clamping receptacles arranged on either side of said flange clamping receptacle;
said flange clamping receptacle defining an interior; and,
said inner sleeve being arranged in said interior and being configured to project into said two of said at least two seat clamping receptacles arranged adjacent to said flange clamping receptacle.

13. The seating device of claim 1, wherein:
said at least one seat has a seating surface and a backrest;
said seating surface and said backrest being interconnected at a connecting region;
said seating surface is configured to have a person sit thereon and has a first side facing away from the person sitting thereon;
said at least one seat clamping receptacle is arranged at said first side of said seating surface; and,
said at least one seat clamping receptacle being arranged on said at least one seat at a distance of less than 20 centimeters from said connecting region.

14. The seating device of claim 1, wherein the movement mechanism is a carnival ride.

* * * * *